Patented Apr. 11, 1944

UNITED STATES PATENT OFFICE 2,346,600

THERMOPLASTIC LACQUER

Victor A. Navikas, Lancaster, Pa., assignor to Armstrong Cork Company, Lancaster, Pa., a corporation of Pennsylvania No Drawing. Application January 23, 1942, Serial No. 427,878

13 Claims. (Cl. 260—17)

This invention relates generally to lacquers and more particularly to thermoplastic lacquers which may be used both as a protective coating for container closures and as an adhesive to unite the closure liner to the inner surface of the closure shell. Among the closures with which the thermoplastic lacquers of my invention are utilized are those known to the art as crown closures. These crown closures are used for packaging pressure foods and beverages and they comprise a metal crown having a liner of suitable material secured thereto. These liners are customarily of natural cork, cork composition, and the like.

When these crowns are manufactured by methods which employ an adhesive lacquer or thermoplastic lacquer, metal sheets of the proper thickness are usually lithographed and coated with a finishing lacquer. The sheet is then turned over and coated with an adhesive lacquer or thermoplastic lacquer, baked, and then stacked until the metal sheets are punched and formed into crown shells in the crown presses. The crown shells are transmitted to the assembly machines where the liners are inserted. In the assembly machines, the metal crown shells are heated to soften the thermoplastic lacquer and the liners are pressed against this lacquer coated inner surface of the crown shell and held there after the heat is removed and the coating cooled to an extent sufficient to form a bond between the shell and liner. It can be seen, therefore, that a thermoplastic lacquer suitable for use in the manufacture of crowns must be capable of easy application at ordinary temperatures, must quickly develop a non-tacky film at room temperatures when subjected to baking temperatures for short periods of time so that sheets coated therewith may be stacked upon each other for considerable periods of time without danger of the sheets adhering to each other, must possess sufficient pliability to withstand the punching operation without cracking or breaking, and must develop sufficient plasticity at elevated temperatures to hold a liner in place until a bond is developed between the liner and the crown shell by hardening of the lacquer.

Heretofore, it has been customary to employ an oleoresinous material as an adhesive lacquer or thermoplastic lacquer in the manufacture of crowns by the method above described. These thermoplastic lacquers of the prior art possess several disadvantages. They exhibit a markedly disagreeable odor and taste which is quite often imparted to the container contents. In addition, they possess very little water resistance and, when subjected to water vapor at elevated temperature, emulsify or cloud, resulting in an unsightly film which is easily cracked or broken off from the crown shell.

I have found a thermoplastic lacquer which not only may be employed as a protective coating for the inner surface of metal closures, but also may be utilized as an adhesive to adhere the lining material to the inner surface of the metal crown shell. Another advantage resulting from my invention in addition to those above set forth is the fact that the thermoplastic lacquer is non-toxic and free from odor and taste and, therefore, may be employed to adhere a washer or ring type liner to a crown shell without danger of imparting any deleterious odor or taste to the container contents or causing any other contamination of the container contents. Where ring type liners are used, the coating in the central area of the crown shell is directly exposed to the container contents. My thermoplastic lacquer is highly water resistant, and therefore does not develop a cloudy brittle film as do the thermoplastic lacquers of the prior art. Because of the nature of my thermoplastic lacquer, it may be readily utilized in the processes of crown assembly now known to the art. The residual solvent of the lacquer may be removed by baking at temperatures from about 200° F. to about 250° F. for a period of about fifteen to thirty minutes, and therefore the coated sheets may be stacked without danger of the sheets adhering to each other. The film thus formed withstands the punching action outlined above without danger of breaking or cracking. At a temperature of about 100° C. to about 150° C. the residual film develops sufficient plasticity to unite a liner of any suitable material to the inner surface of a crown shell as is commonly done in the manufacture of crowns.

The chief ingredient of the thermoplastic lacquer of my invention is an interpolymer of n-butyl methacrylate and isobutyl methacrylate. The proportions of the individual methacrylates may vary without departing from the scope of my invention. However, I have obtained particularly advantageous results when the interpolymer contains about 75% by weight of the isobutyl methacrylate.

The second ingredient of my composition is a coumarone-indene resin which imparts sufficient thermoplasticity to the final composition to allow a wide temperature range of application. This coumarone-indene resin is steamed at a temperature of about 150° C. to 175° C. until the odorous volatile oils present are removed. The time required varies depending upon the rate of flow of the steam, the temperature of treatment, and the size of the batch under treatment.

In order to improve the abrasion resistance and toughness of the final composition, I also utilize a reinforcing agent, specifically nitrocellulose. The nitrocellulose which I have used most advantageously is a nitrocellulose composition having five to six seconds viscosity as determined by the falling ball method. This method of viscosity determination has been standardized by the A. S. T. M. and comprises a method in which a standard solution, usually 13%, of nitrocellulose is placed in a tube ten inches long, and a five-sixteenth inch diameter steel ball is allowed to drop into the standard solution of nitrocellulose. The time required for the ball to fall to the bottom of the ten-inch tube is measured in seconds. The number of seconds required is given as the viscosity of the nitrocellulose.

To the above composition various odorless plasticizers may be added to adjust the final plasticity of the composition. Such plasticizers may be, for example, diphenyl (ortho-xenyl) phosphate, butyl phthalyl butyl glycollate, and the like.

My lacquer composition also includes a solvent, and of the solvents which are capable of use in my composition, I may mention aliphatic esters, for example, n-butyl acetate, isobutyl acetate, ethyl acetate, isopropyl acetate, and the like or mixtures of these esters with hydrocarbon solvents, for example, benzol, toluol, xylol, hexane, and the like. I prefer to employ a solvent mixture of n-butyl acetate and xylol in such proportion that a stable solution is obtained. Such a stable solution has a viscosity of two to ten poises at 25° C. and contains about 35% to 40% solids.

Although the proportions of the various ingredients of my composition may be varied somewhat, I have obtained particularly advantageous results when the following proportions are employed:

| Constituent | Parts by weight |
| --- | --- |
| Intermethacrylate polymer | 3 to 9 |
| Coumarone-indene resin | 1½ to 6 |
| Nitrocellulose | ½ to 3 |
| Plasticizer | 1 to 5 |

To the above composition sufficient solvent is added to adjust the final composition to a viscosity of about two to ten poises at 25° C. and a composition having about 35% to 40% solids. When I employ a solvent mixture of an aliphatic ester and a hydrocarbon, I prefer to utilize a mixture containing about two parts by weight of ester to about one part by weight of a hydrocarbon solvent. When more than about six parts by weight of coumarone-indene resin is employed, the composition tends to be too tacky, and when the metal sheets containing a coating of a composition are stacked one upon the other, there is danger of the sheets adhering to each other. When less than one and one-half parts by weight of coumarone-indene resin is utilized, the thermoplastic lacquer tends to become too hard, and when the punch is applied to the metal sheet to form the crown, there is danger of the coating breaking or cracking off from the metal sheet. Should too much plasticizer be employed in formulating the thermoplastic lacquer of my invention, a soft film is developed which tends to loosen during fabrication of the crown. When the proportion of plasticizer is too low, the thermoplastic lacquer does not develop sufficient plasticity upon the application of elevated temperatures to form a bond between the liner and the crown shell.

The following specific examples of my invention are given by way of illustration and not by limitation:

*Example I*

| Constituent | Parts by weight |
| --- | --- |
| Interpolymer of n-butyl methacrylate and isobutyl methacrylate containing 75% by weight of isobutyl methacrylate | 9 |
| Coumarone-indene resin | 6 |
| Nitrocellulose (5 to 6 sec.) | 3 |
| Diphenyl (ortho-xenyl) phosphate | 5 |

To the above was added a mixture of xylol and n-butyl acetate in an amount sufficient to bring the final composition to 35% solids and a viscosity of two poises at 25° C.

*Example II*

| Constituent | Parts by weight |
| --- | --- |
| Interpolymer of n-butyl methacrylate and isobutyl methacrylate containing 75% by weight of isobutyl methacrylate | 7 |
| Coumarone-indene resin | 5 |
| Nitrocellulose (5 to 6 sec.) | 2 |
| Butyl phthalyl butyl glycollate | 4 |

A mixture of toluol and ethyl acetate in an amount sufficient to bring the viscosity of the composition to three poises at 25° C., and adjust the composition to one containing 40% solids was added to the above.

The following specific example is illustrative of the most advantageous modification of my invention:

*Example III*

| Constituent | Parts by weight |
| --- | --- |
| Interpolymer of n-butyl methacrylate and isobutyl methacrylate containing 75% by weight of isobutyl methacrylate | 6 |
| Coumarone-indene resin | 3 |
| Nitrocellulose (5 to 6 sec.) | 1.25 |
| Diphenyl (ortho-xenyl) phosphate | 2.5 |
| Xylol | 11 |
| N-butyl acetate | 25 |

The ingredients and proportions of ingredients set forth in the above specific examples may be varied without departing from the scope of my invention and the plasticizers may be substituted for by other compatible plasticizers which are non-toxic and free from odor and taste or which do not impart taste and odor to the film. The solvents may be substituted for by other readily evaporable solvents which are capable of dissolving the compositions outlined above. Small amounts of coloring materials may be added if desired.

Thermoplastic lacquers made in accordance with my invention in addition to being non-toxic and capable of forming odorless and tasteless films, develop excellent adhesion at temperatures of about 100° C. to 150° C. This latter property makes the thermoplastic lacquer particularly suitable for use as an adhesive in the assembly of a crown closure. When the lacquers of my invention are employed, a ring or washer type of liner may be used without danger of contamination of the contents of a container, for the exposed surface of the crown shell is coated with a non-toxic, odorless and tasteless film.

This thermoplastic lacquer of my invention may be readily applied to metal sheets and develops excellent adhesion between metal and cork, cork composition, rubber, rubberlike materials, plastic films, fiberboard, paper, and the like.

Although my invention has been illustrated with reference to certain specific examples and embodiments, I do not intend to limit myself thereby, but the invention may be otherwise embodied and practiced within the scope of the appended claims.

I claim:

1. A thermoplastic lacquer comprising 3 to 9 parts by weight of an interpolymer of isobutyl methacrylate and n-butyl methacrylate, 1½ to 6 parts by weight of a coumarone-indene resin, ½ to 3 parts by weight of nitrocellulose, 1 to 5 parts by weight of a plasticizer which does not impart taste and odor, and a solvent, said ingredients being in such proportions that the composition, when baked at a temperature of about 200° F. to about 250° F., develops a film which is hard and nontacky at room temperatures and which becomes plastic and tacky when subjected to temperatures of about 100° C. to about 150° C.

2. A thermoplastic lacquer comprising 3 to 9 parts by weight of an interpolymer of isobutyl methacrylate and n-butyl methacrylate containing about 75% by weight of isobutyl methacrylate, 1½ to 6 parts by weight of a coumarone-indene resin, ½ to 3 parts by weight of nitrocellulose, 1 to 5 parts by weight of a plasticizer which does not impart taste and odor, and a solvent, said ingredients being in such proportions that the composition, when baked at a temperature of about 200° F. to about 250° F. for about fifteen to thirty minutes, develops a film which is hard and non-tacky at room temperatures and which becomes plastic and tacky at temperatures of about 100° C. to about 150° C.

3. A thermoplastic lacquer comprising 3 to 9 parts by weight of an interpolymer of isobutyl methacrylate and n-butyl methacrylate, 1½ to 6 parts by weight of a coumarone-indene resin, ½ to 3 parts by weight of nitrocellulose, 1 to 5 parts by weight of a plasticizer which does not impart taste or odor, and sufficient solvent to adjust the viscosity of the composition to about 2 to 10 poises at 25° C.

4. A thermoplastic lacquer comprising 3 to 9 parts by weight of an interpolymer of isobutyl methacrylate and n-butyl methacrylate, 1½ to 6 parts by weight of a coumarone-indene resin, ½ to 3 parts by weight of nitrocellulose having a viscosity of 5 to 6 seconds, 1 to 5 parts by weight of diphenyl (ortho-xenyl) phosphate, and a solvent comprising a mixture of an aliphatic ester and a hydrocarbon in an amount sufficient to adjust the viscosity of the composition to about 2 to 10 poises at 25° C.

5. A thermoplastic lacquer comprising 6 parts by weight of an interpolymer of isobutyl methacrylate and n-butyl methacrylate, 3 parts by weight of a coumarone-indene resin, 1.25 parts by weight nitrocellulose having a viscosity of 5 to 6 seconds, 2½ parts by weight diphenyl (ortho-xenyl) phosphate, 11 parts by weight xylol, and 25 parts by weight n-butyl acetate.

6. A thermoplastic lacquer comprising 3 to 9 parts by weight of an interpolymer of isobutyl methacrylate and n-butyl methacrylate containing about 75% by weight of isobutyl methacrylate, 1½ to 6 parts by weight of a coumarone-indene resin, ½ to 3 parts by weight of nitrocellulose, 1 to 5 parts by weight of a plasticizer which does not impart taste or odor, and sufficient solvent to adjust the viscosity of the composition to about 2 to 10 poises at 25° C.

7. A thermoplastic lacquer comprising 3 to 9 parts by weight of an interpolymer of isobutyl methacrylate and n-butyl methacrylate containing about 75% by weight of isobutyl methacrylate, 1½ to 6 parts by weight of a coumarone-indene resin, ½ to 3 parts by weight of nitrocellulose having a viscosity of 5 to 6 seconds, 1 to 5 parts by weight of diphenyl (ortho-xenyl) phosphate, and a solvent comprising a mixture of an aliphatic ester and a hydrocarbon in an amount sufficient to adjust the viscosity of the composition to about 2 to 10 poises at 25° C.

8. A thermoplastic lacquer comprising 6 parts by weight of an interpolymer of isobutyl methacrylate and n-butyl methacrylate containing about 75% by weight of isobutyl methacrylate, 3 parts by weight of a coumarone-indene resin, 1.25 parts by weight nitrocellulose having a viscosity of 5 to 6 seconds, 2½ parts by weight of diphenyl (ortho-xenyl) phosphate, 11 parts by weight of xylol and 25 parts by weight n-butyl acetate.

9. A base and a tasteless and odorless, thermoplastic adhesive film thereon comprising 3 to 9 parts by weight of an interpolymer of isobutyl methacrylate and n-butyl methacrylate, 1½ to 6 parts by weight of a substantially odorless and tasteless coumarone-indene resin, ½ to 3 parts by weight of nitrocellulose, and 1 to 5 parts by weight of a plasticizer which does not impart taste and odor to said film, said ingredients being in such proportions that said film is plastic and tacky at temperatures of about 100° C. to 150° C. and is hard and nontacky at lower room temperatures.

10. A base and a tasteless and odorless, thermoplastic film thereon comprising 3 to 9 parts by weight of an interpolymer of isobutyl and n-butyl methacrylate, 1½ to 6 parts by weight of a substantially odorless and tasteless coumarone-indene resin, ½ to 3 parts by weight of nitrocellulose, and 1 to 5 parts by weight of plasticizer which does not impart taste or odor to said film.

11. A closure having thereon a tasteless and odorless, thermoplastic film comprising 3 to 9 parts by weight of an interpolymer of isobutyl methacrylate and n-butyl methacrylate containing about 75% by weight of isobutyl methacrylate, 1½ to 6 parts by weight of a substantially odorless and tasteless coumarone-indene resin, ½ to 3 parts by weight of nitrocellulose, and 1 to 5 parts by weight of plasticizer which does not impart odor or taste to said film.

12. A metal closure having thereon a tasteless and odorless, thermoplastic film comprising 3 to 9 parts by weight of an interpolymer of isobutyl methacrylate and n-butyl methacrylate, 1½ to 6 parts by weight of a substantially tasteless and odorless coumarone-indene resin, ½ to 3 parts by weight of nitrocellulose having a viscosity of 5 to 6 seconds, and 1 to 5 parts by weight of diphenyl (ortho-xenyl) phosphate.

13. A metal closure shell having thereon a tasteless and odorless thermoplastic adhesive film comprising about 37% to 47% by weight of an interpolymer of isobutyl methacrylate and n-butyl methacrylate containing 75% by weight of isobutyl methacrylate, about 23% to 28% by weight of coumarone-indene resin, about 9% to 14% by weight of nitrocellulose, and about 19% to 23% by weight of a plasticizer which does not impart taste and odor to said film.

VICTOR A. NAVIKAS.